April 8, 1969     E. E. ELLINGTON     3,436,839
METHOD AND APPARATUS OF HEATING SPENT ADSORBER BEDS
Filed Dec. 1, 1966
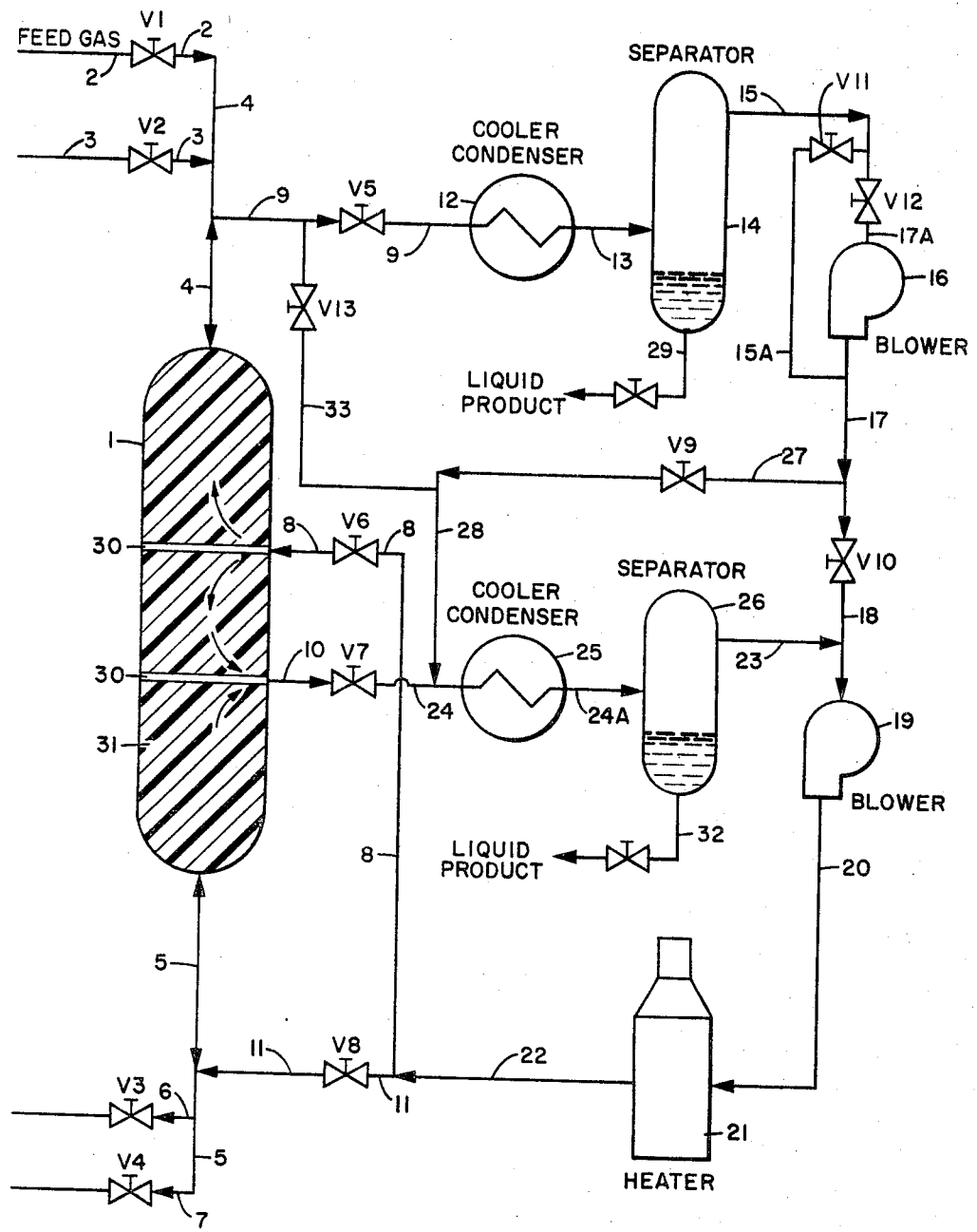
INVENTOR.
EUGENE E. ELLINGTON
BY
Van D. Harrison, Jr.
AGENT

United States Patent Office 3,436,839
Patented Apr. 8, 1969

3,436,839
METHOD AND APPARATUS OF HEATING SPENT ADSORBER BEDS
Eugene E. Ellington, Ponca City, Okla., assignor to Continental Oil Company, a corporation of Delaware
Filed Dec. 1, 1966, Ser. No. 598,508
Int. Cl. F26b 21/06; B01d 53/04
U.S. Cl. 34—80                               6 Claims

ABSTRACT OF THE DISCLOSURE

A sorbent body containing adsorbed condensables is stripped of said condensables by introducing a heated dry gas at two or more locations into the sorbent body and removing the heated gas at two or more other locations. The effluent gas streams, either in combination or separately, are cooled, and condensed liquids collected and recovered. Uncondensed gas is reheated and recirculated to the sorbent body.

---

This invention relates to method and apparatus for recovering condensables from gas streams by adsorption. More specifically this invention relates to an improved method of heating a spent sorbent bed and recovering adsorbed condensables therefrom.

In a common method of removing vaporized condensable liquids from a gas stream, the latter is flowed through a bed of sorbent material such as particulate silica gel or activated carbon. With continued exposure to the gas, the sorbent material adsorbs and becomes saturated with condensables. The saturated sorbent usually is then heated and the adsorbed condensables vaporized by flowing a heated dry gas through the sorbent. The flow of the heated dry gas usually is in the same direction as feed gas flow to prevent bed attrition due to agitation. This gas, upon emerging from the sorbent bed, is cooled; the liquid condensables therein are condensed, separated from the gas, and withdrawn from the system. In this manner, vaporized hydrocarbon liquid can be extracted from a hydrocarbon gas stream.

When a hydrocarbon gas containing condensables is flowed through a sorbent body, the distribution of condensables adsorbed by the sorbent body roughly assumes a pattern wherein the condensables of heaviest molecular weight are concentrated nearest the source of gas flow; the concentrations of the remaining hydrocarbons progressively are distributed through the sorbent bed roughly in inverse correspondence to their molecular weight. The lighter adsorbed hydrocarbons thus will tend to be concentrated farthest from the source of gas flow. If all these condensables later are removed together from the sorbent body, the resulting mixture of hydrocarbons requires further fractionation to obtain the desired hydrocarbon cuts.

In addition, the distribution of concentration zones of condensables in the sorbent body makes heating of the bed less efficient, since in the heating process each condensable fraction repeatedly must be desorbed and adsorbed in traversing the sorbent body as simultaneously a maximum temperature heat front permeates through the sorbent body.

An object of this invention is to present a more efficient method of removing the adsorbed condensables from a sorbent bed.

Another object of this invention is to present a method of removing adsorbed condensables from a sorbent bed wherein during the process of removal the condensables can be condensed into at least two liquid fractions.

Other objects and advantages will be apparent from the accompanying disclosure, claims, and the attached figure which presents schematically one embodiment of this invention.

In brief, this invention comprises method and apparatus for removing adsorbed condensables in at least two separate fractions from a sorbent body wherein a first stream of heated gas is flowed through a first portion of sorbent body containing adsorbed condensables, thereby vaporizing the condensables from that portion into the flowing gas stream, and a second stream of heated gas is flowed through a second portion of the sorbent body, thereby vaporizing condensables adsorbed in this second portion into the second stream of gas. Preferably, the heated gas is introduced into the sorbent body so that the major portion of the gas flow will be in a direction counter to the direction of feed gas flowing during the adsorption or raw gas treating cycle. Each stream of gas, after it emerges from the sorbent bed, is cooled separately to a temperature where liquid in the gas can be condensed and collected.

In a variation of this method, the separate effluent streams containing vaporized condensables are combined before being cooled, and liquid condensed from the combined streams is collected.

The method of our invention will now be described with reference to the accompanying figure.

Only one adsorber is shown in the figure for the sake of clarity. In a cyclical gas treating process, however, a number of adsorber beds can be used so that one adsorber is in an adsorption or gas treating cycle, a second is in a heating cycle to remove adsorbed condensables, and a third adsorber bed may be in a cooling cycle.

The following disclosure described the invention as applied to a hydrocarbon gas containing condensables. It will be readily apparent that the method and apparatus is equally applicable to extracting condensables from other types of gases.

Adsorber 1 contains a solid sorbent material 31 such as particulate silica gel or activated carbon, suitable for removing condensable hydrocarbons from a hydrocarbon gas. Let it be assumed that adsorber 1 has become saturated with condensables by flowing through it a gas available through valved conduit 2 and conduit 4. The stripped residue gas has been discarded through conduit 5 and valved conduit 6. A stream of cooling gas for subsequent use is available through valved conduit 3 and conduit 4, and can be vented through valved conduit 7 and conduit 5.

During the heating cycle, valves V1, V2, V3 V4, and V9 are closed; valves V5, V6, V7, V8, and V10 are open. Valve V11 usually is open and valve V12 closed. Valve V11 may, however, be closed and valve V12 opened. Valve V13 in conduit 33 will be closed. A hot, initially unsaturated, gas is flowed into the upper portion of adsorber 1 through valved conduit 8 and is discharged in part through conduits 4 and 9 and in part through valved conduit 10. Similarly, heated gas is flowed into the remaining portion of absorber 1 from valved conduit 11 and conduit 5 and discharged through valved conduit 10. Pairs of perforated plates 30 support the sorbent material 31 and provide spaced intervals void of sorbent material and communicating with conduits 8 and 10, through which the hot gas can be introduced to and removed from a maximum cross sectional area of adsorber 1 with minimum disturbance and erosion of the sorbent material 31. The gas stream in conduits 4 and 9 is flowed through valve V5, cooler-condenser 12, conduit 13, and separator 14, where the liquid condensables are collected and withdrawn from the system. The residual overhead gas is flowed into conduit 15, and normally through valve V11, conduit 15A, into and through conduit 17 valve V10, and conduit 18, where it mixes with gas from conduit 23. Blower 16 in conduit 17A is available if additional circulating force is necessary. Usually, however, it will be preferable to route gas flow through conduit 15A by maintaining valve V11 open and valve V12 closed. Similarly, the gas stream in conduit 10 is flowed through valve V7, conduit 24, cooler-condenser 25, conduit 24A, and separator 26, where the liquid condensables are collected and withdrawn from the system. The residual overhead gas flows through conduit 23 where it mixes with gas in conduit 18. The mixed stream of gas then flows through blower 19, conduit 20, heater 21, conduit 22, divides into two flow streams through conduits 8, and 11 and 5, respectively, and returns to adsorber 1. Because the distribution of hydrocarbon condensables in adsorber 1 varies from a heavy hydrocarbon at the upper end to the less heavy hydrocarbons nearer the bottom, the composition of the liquid condensables withdrawn from the two separators 14 and 26 through valved conduits 28 and 29, respectively, will be substantially different. If the feed gas has a constant composition, the optimum locations at which the heated gas streams should be injected and withdrawn from adsorber 1 can be determined. It is thus possible, for example, to inject gas through conduit 8 and conduit 5, each at a point so that the butanes and heavier hydrocarbons, and only a small fraction of the total propane, will be carried off through conduits 4 and 9, and most of the lighter condensables (propane) carried off in conduit 10.

In some circumstances it may be desirable to flow the effluent gas from one separator into the gas stream moving into the other separator, conjunction of the two streams being accomplished at some point upstream of the second condenser. For example, in the accompanying figure, valve V10 in conduit 18 can be closed and valve V9 in conduit 27 opened so that overhead gas from separator 14 flows through conduits 15, 15A, 17, and 27, valve V9, conduit 28, and into conduit 24 upstream of cooler-condenser 25. The combined gas then flows through cooler-condenser 25, separator 26, conduit 23, blower 19, conduit 20, and continues along the flow path described previously.

In other applications of my invention, it may be desirable to remove the vaporized condensables from the sorbent bed 1 in two fractions but to combine the fractions before cooling and condensing. In this case, valve V5 and valve V9 can be closed and valve V13 opened so that the total flow of vaporized condensables will be through cooler-condenser 25, separator 26, heater 21, and back to conduits 10 and 11.

When adsorber 1 has been heated sufficiently to vaporize all the adsorbed condensables contained therein, the flow of heated gas to it is diverted and is placed in some other phase of the cycle such as a purging or cooling step.

By following the previously described method, it will be apparent that an improved method of removing the adsorbed condensate from a sorbent bed has been developed. Although in the above disclosure two conduits flow gas into the bed and two conduits flow gas out of the bed, additional conduits can be added to separate the vaporized condensables in adsorber 1 into more than two fractions if desired.

The apparatus of our invention will now be described with reference to the accompanying figure.

Adsorber 1 is a vessel adapted to contain a particulate solid sorbent material 31 such as particulate silica gel or activated carbon. Pairs of perforated plates 30 support the sorbent material 31 and provide spaced intervals void of sorbent material and communicating with conduits 8 and 10. Conduit 4 connects adsorber 1 to valved conduits 2 and 3, through which feed gas and a cooling gas, respectively, are flowed through adsorber 1. Conduit 5 connects adsorber 1 to valved conduits 6 and 7, through which residue gas and cooling gas, respectively, are vented from adsorber 1. Valved conduit 10, and conduit 24, connect adsorber 1 to cooler-condenser 25, which in turn is connected to separator 26 by conduit 24A. Valved conduit 32 conducts liquid condensable from separator 26. Conduit 23 (the gas effluent conduit from separator 26) connects with conduit 18, which in turn connects with blower 19. Conduit 20 connects blower 19 and heater 21. Conduit 22 connects heater 21 with valved conduits 11 and 8, which in turn connect with adsorber 1. Conduits 4 and 9 connect cooler-condenser 12 with adsorber 1. Conduit 13 connects cooler-condenser 12 and separator 14. Valved conduit 29 carries liquid condensables from separator 14. Conduit 15 (the gas effluent conduit from separator 14) connects with blower 16 through valved conduit 17A. Conduit 17 connects the exhaust side of blower 16 to conduit 18 leading to blower 19. Conduit 15A interrupted by valve V11 provides a bypass around blower 16. Valved conduit 27 connects conduits 17 and 24 so that flow can be diverted from blower 16 to the upstream side of cooler-condenser 25 and separator 26.

Heated gas thus can flow through conduit 8 and the upper part of adsorber 1. The gas then flows through conduits 4 and 9 where it is cooled in cooler-condenser 12 and condensables are collected in separator 14. The gas then flows through conduit 15, conduit 15A (or, alternatively, conduit 17A and blower 16), conduit 17, valve V10, and conduit 18. Similarly, heated gas flows through conduits 11 and 5, where another part of adsorber 1 is heated. Heating gas then flows through conduits 10 and 24, cooler-condenser 25, and separator 26, where condensables are collected. The residue gas from separator 26 flows through conduit 23 and mingles with gas from conduit 17. The combined gas stream then flows through conduit 18, blower 19, conduit 20, heater 21, and divides into the two heated streams flowing through conduits 11 and 8.

The proportion of flow to various bed segments can be controlled by pressure control valves in conduits 9 and 10. Valved conduit 33 connects conduits 9 and 28 for use if all effluent from adsorber 1 is to pass into cooler-condenser 25 by closing valves V5 and V9 and opening valve V13.

*Example*

In a gas treating plant, three adsorbers containing activated carbon of 8 mesh are cyclically contacted, first by a hydrocarbon gas from which condensable hydrocarbons are adsorbed, secondly by a heated gas, and finally by a dry cooling gas. Each adsorber is in each of the heating, sorbing, and cooling phases about 17 minutes. During the sorption phase raw feed gas flows through each adsorber at about 15,000 cubic feet per minute measured at 14.65 p.s.i.a. and 60° F. Each adsorber is heated and desaturated of condensables adsorbed therein by the method and apparatus of this invention as depicted in the attached figure. Heated gas at an average temperature of 600° F. and 500 p.s.i.a. flows through conduit 8 at a rate of 9160 cubic feet per minute and through conduit 5 at a rate of 3275 cubic feet per minute. Pressure in adsorber 1 is 500 p.s.i.a. Gas at an average temperature of 450° F. flows at a rate of 5437 cubic feet per minute through conduits 4 and 9 to cooler-condenser 12, which operates at a pressure of 495 p.s.i.a. and average temperature of 95° F. The gas in cooler-condenser 12 is cooled to an average temperature of 95° F. Separator 14 operates at a temperature of 95° F. and 490 p.s.i.g. Residue gas from separator 14 flows through conduits 15, 15A, and 17 at a rate of 5014 cubic feet per minute. Gas flows through conduit 10 at a rate of 7586 cubic feet per minute at an average temperature of 470° F. to cooler-condenser 25, which operates at a pressure of 495 p.s.i.a. and a temperature of 95° F. The gas in cooler 25 is cooled to a temperature of 95° F. Separator 26 operates at a temperature of 95° F. and a pressure of 490 p.s.i.a. Gas flows through conduit 23 at a rate of 7421 cubic feet per minute at 490 p.s.i.a. and mixes with gas from conduit 17. The mixed gas flows through conduit 18 at 12,435 cubic feet per minute and 490 p.s.i.a. into blower 19 operating at an inlet pressure of 490 p.s.i.a. and an exhaust pressure of 515 p.s.i.a. The gas in heater 21 is heated to an average temperature of 600° F. Heater 21 is designed for a maximum output of 243,000 B.t.u. per minute and has a maximum operating temperature of 750° F. The composition of the hydrocarbon streams at various points in the system are as follows:

| Conduit | Mol percent | | | | | | | |
|---|---|---|---|---|---|---|---|---|
| | $C_1$ | $C_2$ | $C_3$ | $i\text{-}C_4$ | $n\text{-}C_4$ | $i\text{-}C_5$ | $n\text{-}C_5$ | $C_6+$ |
| 9 | 65.54 | 7.33 | 18.08 | 4.06 | 2.28 | 1.28 | 0.78 | 0.65 |
| 15 | 69.42 | 7.44 | 16.80 | 3.32 | 1.74 | 0.75 | 0.42 | 0.11 |
| 29 | 12.10 | 5.63 | 35.44 | 14.22 | 9.62 | 8.65 | 5.89 | 8.45 |
| 10 | 65.12 | 7.41 | 19.76 | 4.38 | 2.48 | 0.49 | 0.25 | 0.06 |
| 23 | 65.74 | 7.47 | 19.53 | 4.25 | 2.37 | 0.41 | 0.21 | 0.02 |
| 32 | 11.45 | 5.65 | 41.10 | 18.19 | 13.10 | 5.15 | 3.17 | 2.19 |
| 20 | 67.15 | 7.47 | 18.42 | 3.87 | 2.12 | 0.57 | 0.30 | 0.05 |
| 2 | 89.64 | 6.33 | 2.18 | 0.74 | 0.47 | 0.28 | 0.19 | 0.22 |
| 5 | 93.05 | 6.37 | 0.58 | Tr. | 0 | 0 | 0 | 0 |

An average of 10.89 gallons per minute of condensables are recovered through conduit 29 and an average of 2.11 gallons per minute through conduit 32.

Reasonable variation and modification are possible within the scope of the foregoing disclosure and the appended claims to the invention, the essence of which comprises circulating at least two streams of a heated gas through a saturated sorbent bed, thereby vaporizing the adsorbed condensables into the circulating gas stream and subsequently recovering separately condensed condensables from each stream.

I claim:

1. A method of removing adsorbed condensables in at least two separate fractions from a sorbent body comprising:
    (a) flowing a first stream of a heated gas through a first portion of said sorbent body, thereby vaporizing condensables adsorbed in said first portion;
    (b) simultaneously flowing a second stream of heated gas through a second portion of said sorbent body, thereby vaporizing condensables adsorbed in said second portion;
    (c) maintaining said first stream of (a) separate from said second stream of (b); and
    (d) simultaneously recovering said vaporized condensables from said first and second streams of heated gas while said streams are maintained separately.

2. A method of removing adsorbed condensables in at least two separate fractions from a sorbent body comprising:
    (a) flowing a first stream of heated gas through a first portion of said sorbent body, thereby vaporizing condensables adsorbed in said first portion;
    (b) cooling said first stream after emergence from said first portion of said sorbent body;
    (c) condensing and collecting liquid condensables from said first stream;
    (d) simultaneously flowing a second stream of heated gas through a second portion of said sorbent body, thereby vaporizing condensables adsorbed in said second portion, while maintaining said second stream separate from said first stream of (a);
    (e) simultaneously cooling said second stream after emergence from said second portion of said sorbent body while maintaining said second stream separate from said first stream of (b); and
    (f) simultaneously condensing and collecting liquid condensables from said second stream while maintaining said second stream separate from said first stream of (c).

3. The method of claim 2 wherein said adsorbed condensables are hydrocarbons.

4. The method of claim 2 wherein said adsorbed condensables are water.

5. The method of claim 2 wherein:
    (g) residual gas from step (c) is heated and at least a portion thereof returned to said first stream of (a) upstream of said first portion of said sorbent body; and
    (h) residual gas from step (f) is heated and at least a portion thereof returned to said second stream of (d) upstream of said second portion of said sorbent body.

6. A method of removing adsorbed condensables in at least two separate fractions from a sorbent body comprising:
    (a) flowing a first stream of heated gas through a first portion of said sorbent body, thereby vaporizing condensables adsorbed in said first portion;
    (b) cooling said first stream after emergence from said first portion of said sorbent body;
    (c) condensing and collecting liquid condensables from said first stream, thereby creating a residue gas stream;
    (d) simultaneously flowing a second stream of heated gas through a second portion of said sorbent body, thereby vaporizing condensables adsorbed in said second portion, while maintaining said second stream separate from said first stream of (a);
    (e) combining the residue gas stream from said first stream of (c) with said second stream of heated gas after it leaves said second portion of said sorbent body in (d);
    (f) cooling the resulting combined stream of (e); and
    (g) collecting liquid condensables from the cooled stream of (f) separately from the cooled stream of (b).

References Cited

UNITED STATES PATENTS

| 1,875,199 | 8/1932 | Parkman | 55—163 XR |
| 2,136,513 | 11/1938 | Lednum | 55—33 XR |
| 2,359,660 | 10/1944 | Martin et al. | 55—33 |
| 2,651,603 | 9/1953 | Martin et al. | 55—62 XR |

FOREIGN PATENTS 898,161  6/1944  France.

CHARLES J. MYHRE, *Primary Examiner.*

H. B. RAMEY, *Assistant Examiner.*

U.S. Cl. X.R.

55—33, 159